(12) United States Patent
Kagimoto et al.

(10) Patent No.: US 11,768,024 B2
(45) Date of Patent: Sep. 26, 2023

(54) CONSTANT TEMPERATURE CONTAINER

(71) Applicant: Panasonic Intellectual Property Management Co., Ltd., Osaka (JP)

(72) Inventors: Masahiro Kagimoto, Shiga (JP); Shinya Kojima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/619,573

(22) PCT Filed: Jun. 12, 2020

(86) PCT No.: PCT/JP2020/023256
§ 371 (c)(1),
(2) Date: Dec. 15, 2021

(87) PCT Pub. No.: WO2020/255886
PCT Pub. Date: Dec. 24, 2020

(65) Prior Publication Data
US 2022/0349643 A1    Nov. 3, 2022

(30) Foreign Application Priority Data
Jun. 17, 2019 (JP) .................................. 2019-112242

(51) Int. Cl.
*F25D 3/08* (2006.01)
*B65D 25/10* (2006.01)
(Continued)

(52) U.S. Cl.
CPC ............. *F25D 3/08* (2013.01); *B65D 25/108* (2013.01); *B65D 25/2867* (2013.01); *B65D 81/3823* (2013.01)

(58) Field of Classification Search
CPC ... F25D 3/08; F25D 3/00; F25D 23/02; F25D 23/062; F25D 23/08; F25D 2201/10;
(Continued)

(56) References Cited

U.S. PATENT DOCUMENTS

2005/0145635 A1    7/2005  Slovak et al.
2007/0193298 A1*   8/2007  Derifield ............ B65D 81/3827
                                                           62/457.2

(Continued)

FOREIGN PATENT DOCUMENTS

CN    103625781 A  *  3/2014 ............. B23P 15/26
JP    2006045408 A      2/2006
(Continued)

OTHER PUBLICATIONS

Japanese Office Action issued in corresponding Japanese Patent Application No. JP 2021-528186, dated Jun. 28, 2022, with English translation.
(Continued)

*Primary Examiner* — Emmanuel E Duke
(74) *Attorney, Agent, or Firm* — McDermott Will & Emery LLP

(57) ABSTRACT

Provided is a constant temperature container capable of largely improving the heat insulating property. A constant temperature container includes: a heat insulating container; a heat insulating lid configured to close the heat insulating container; a box body housed inside the heat insulating container; a box lid configured to close the box body; a phase change material provided on a bottom portion and a wall portion of the box body and the box lid; and a support member provided between the bottom portion of the box body and a bottom portion of the heat insulating container, the support member supporting the box body in such a
(Continued)

manner that the wall portion of the box body is separated from a wall portion of the heat insulating container.

5 Claims, 4 Drawing Sheets

(51) Int. Cl.
    *B65D 25/28*      (2006.01)
    *B65D 81/38*      (2006.01)
(58) Field of Classification Search
    CPC .. B65D 25/108; B65D 25/2867; B65D 25/00;
        B65D 81/3823; B65D 81/383; B65D
        81/3825; B65D 81/81; B65D 81/264;
        Y02E 60/14; A47J 41/0005; F28D 20/02;
        F28F 9/001
    See application file for complete search history.

(56) References Cited

U.S. PATENT DOCUMENTS

| 2017/0121097 | A1* | 5/2017 | Pranadi | F25D 3/06 |
| 2018/0282019 | A1 | 10/2018 | Harber | |
| 2018/0328644 | A1 | 11/2018 | Rizzo et al. | |
| 2019/0210790 | A1* | 7/2019 | Rizzo | B65D 81/18 |

FOREIGN PATENT DOCUMENTS

| JP | 2013103247 A | 5/2013 | |
| JP | 2014-069868 A | 4/2014 | |
| JP | 2017052522 A | 3/2017 | |
| WO | 2017/085836 A1 | 5/2017 | |
| WO | WO-2020097477 A1 * | 5/2020 | B65D 77/0433 |

OTHER PUBLICATIONS

Extended European Search Report issued in corresponding European Patent Application No. 20827190.8, dated Jul. 14, 2022.
International Search Report and Written Opinion issued in corresponding International Patent Application No. PCT/JP2020/023256, dated Aug. 18, 2020, with partial English translation.
Extended European Search Report issued in corresponding European Patent Application No. 20827190.8, dated Jul. 15, 2022.

* cited by examiner

CONSTANT TEMPERATURE CONTAINER

CROSS-REFERENCE TO RELATED APPLICATIONS

This application is the U.S. National Phase under 35 U.S.C. § 371 of International Application No. PCT/JP2020/023256, filed on Jun. 12, 2020, which claims the benefit of Japanese Application No. 2019-112242, filed on Jun. 17, 2019, the entire contents of each are hereby incorporated by reference.

TECHNICAL FIELD

The present invention relates to a constant temperature container.

BACKGROUND ART

There is known a conventional constant temperature container that has a heat insulating property, and manages and stores a stored item within a predetermine temperature range. A heat insulating material such as a vacuum heat insulating material is used in such a constant temperature container. The constant temperature container may include a storage box for storing a stored item, the storage box including phase change materials provided on a wall portion and a bottom portion thereof and being housed inside the constant temperature container (e.g., refer to Patent Literature 1).

CITATION LIST

Patent Literature

[Patent Literature 1]
Japanese Patent Laid-Open No. 2017-52522

SUMMARY OF INVENTION

Technical Problem

However, in the conventional configuration, the storage box is housed in the heat insulating container with an outer side face of the wall portion kept in contact with an inner wall of the heat insulating container, which may in turn leads to heat transfer caused by heat conduction from the heat insulating container to the storage box.

The present invention provides a constant temperature container capable of largely improving the heat insulating property.

Solution to Problem

A constant temperature container according to an aspect of the present invention includes: a heat insulating container; a heat insulating lid configured to close the heat insulating container; a box body housed inside the heat insulating container; a box lid configured to close the box body; a phase change material provided on a bottom portion and a wall portion of the box body and the box lid; and a support member provided between the bottom portion of the box body and a bottom portion of the heat insulating container, the support member supporting the box body in such a manner that the wall portion of the box body is separated from a wall portion of the heat insulating container.

According to another aspect of the present invention, in the above constant temperature container, the box lid is detachably attached to the box body.

According to another aspect of the present invention, in the above constant temperature container, the box body includes an inner box housed inside the box body, the box lid includes an insertion portion, and the box lid is fixed to the box body by the insertion portion inserted between the box body and the inner box.

According to another aspect of the present invention, in the above constant temperature container, the phase change materials are held between the wall portion of the box body and the inner box.

According to another aspect of the present invention, in the above constant temperature container, the phase change material is covered with a cover, and the box body, the box lid, and the cover are all formed of a transparent material.

Note that the entire contents of Japanese Patent Application No. 2019-112242 filed on Jun. 17, 2019 are incorporated in this specification.

Advantageous Effects of Invention

According to the aspects of the present invention, it is possible to largely improve the heat insulating property.

DESCRIPTION OF EMBODIMENTS

Figure 1:
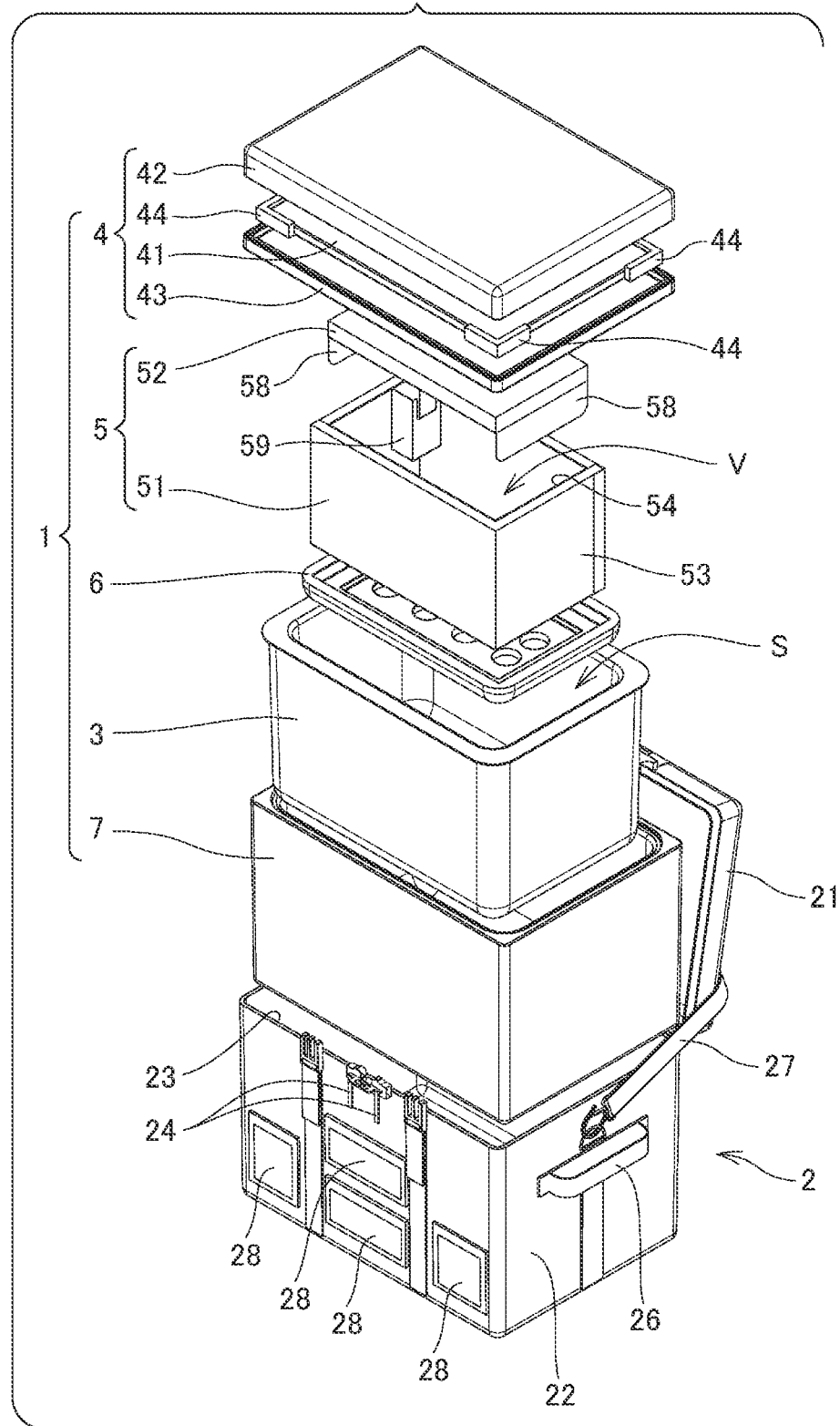
FIG. 1 is an exploded perspective view of a constant temperature container according to an embodiment of the present invention.

A constant temperature container according to a first aspect of the invention includes: a heat insulating container; a heat insulating lid configured to close the heat insulating container; a box body housed inside the heat insulating container; a box lid configured to close the box body; a phase change material provided on a bottom portion and a wall portion of the box body and the box lid; and a support member provided between the bottom portion of the box body and a bottom portion of the heat insulating container, the support member supporting the box body in such a manner that the wall portion of the box body is separated from a wall portion of the heat insulating container.

This makes it possible to reduce the contact area between the box body and the heat insulating container, which reduces heat transfer between the box body and the heat insulating container.

Thus, the heat insulating property of the constant temperature container can be improved.

According to a second aspect of the invention, in the constant temperature container, the box lid of the first aspect of the invention is detachably attached to the box body.

This makes it possible to cool the box body with the box lid detached therefrom and prevents the box body from being closed with the box lid by mistake at the time of cooling.

Thus, the box body can be efficiently cooled.

According to a third aspect of the invention, in the constant temperature container, the box body of the second aspect of the invention includes an inner box housed inside the box body, the box lid includes an insertion portion, and the box lid is fixed to the box body by the insertion portion inserted between the box body and the inner box.

Accordingly, the box lid is aligned with an upper opening of the box body with the insertion portion inserted between the box body and the inner box, and the box lid is appropriately positioned and fixed to the box body.

Thus the box lid can reliably close the box body.

According to a fourth aspect of the invention, in the constant temperature container, the phase change materials are held between the wall portion of the box body and the inner box.

Accordingly, the phase change materials are reliably supported and fixed to the box body.

Thus, it is possible to prevent the phase change materials from separating from each other during conveyance of the constant temperature container.

According to a fifth aspect of the invention, in the constant temperature container, the phase change material of the first to fourth aspects of the invention is covered with a cover, and the box body, the box lid, and the cover are all formed of a transparent material.

This makes it possible to visually check the phase change material stored inside the box body or the box lid from the outside of the box body or the box lid.

Thus, a user of the constant temperature container can visually check the state of the phase change material stored in the box body or the box lid.

Hereinbelow, an embodiment of the present invention will be described with reference to the drawings.

Figure 2:
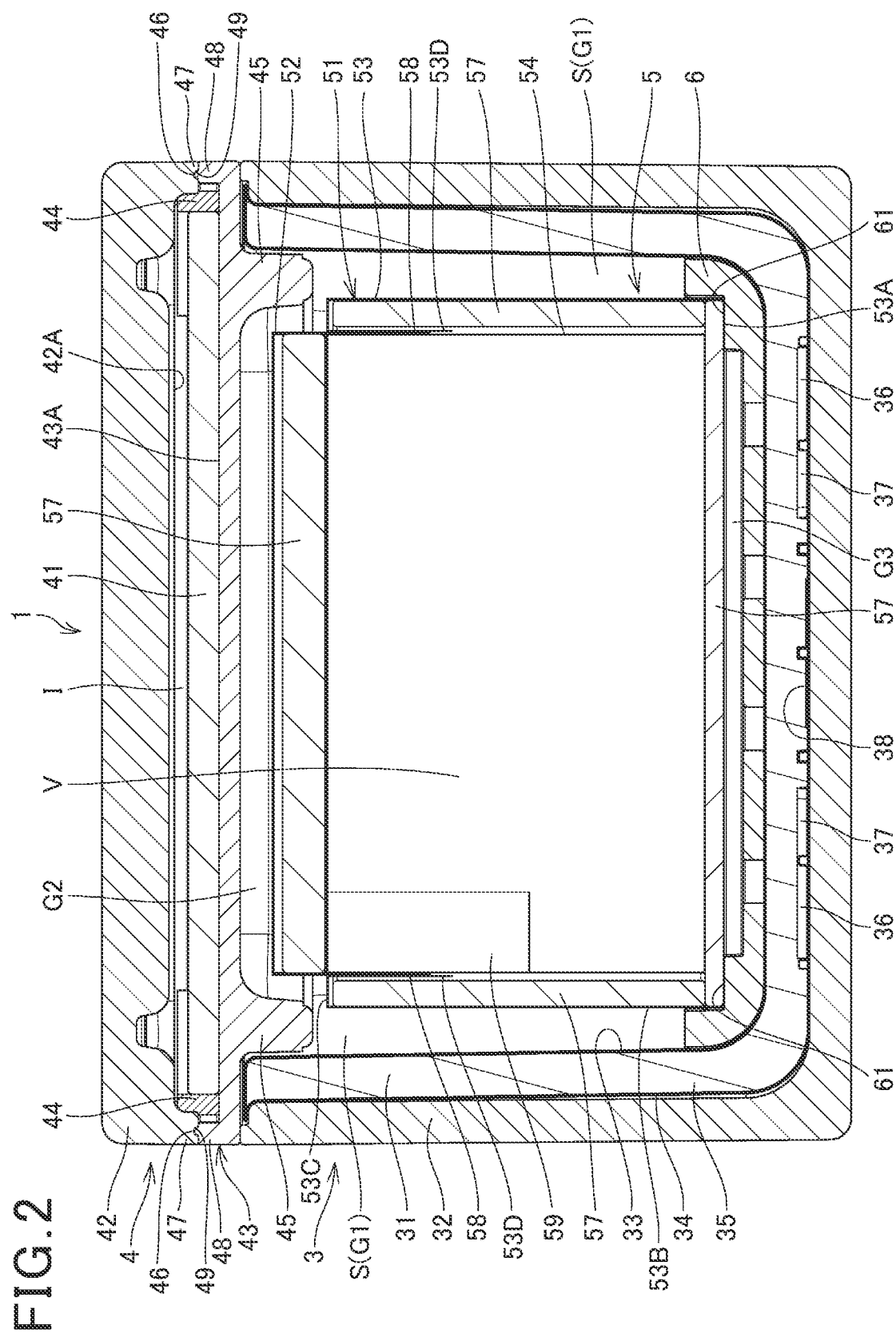
FIG. 2 is a vertical sectional view in a longitudinal direction of the constant temperature container.

FIG. 1 is an exploded perspective view of a constant temperature container 1 according to the embodiment of the present invention. FIG. 2 is a vertical sectional view in a longitudinal direction of the constant temperature container 1. In FIG. 1, the constant temperature container 1 is housed in a container case 2.

As shown in FIGS. 1 and 2, the constant temperature container 1 includes the vacuum heat insulating container 3, a vacuum heat insulating lid 4, and the storage box 5 which is housed in the vacuum heat insulating container 3. The constant temperature container 1 is housed in the container case 2 when used.

Figure 3:
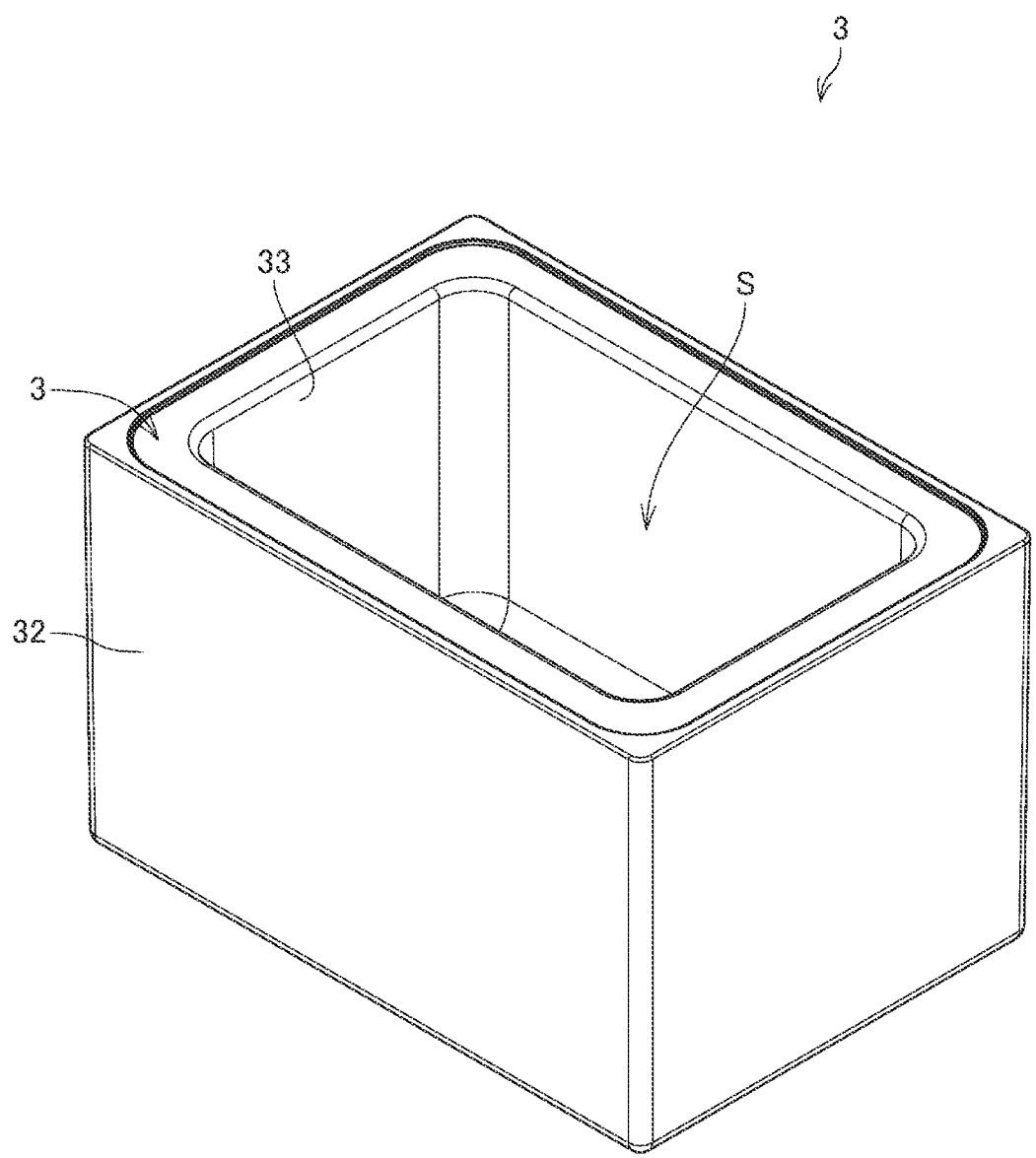
FIG. 3 is a perspective view of a vacuum heat insulating container.

FIG. 3 is a perspective view of the vacuum heat insulating container 3.

The vacuum heat insulating container 3 includes an outer cover material 34.

The outer cover material 34 is formed in a box shape with an open upper face, and an inner cover material 33 is disposed inside the outer cover material 34. The inner cover material 33 has a dimension that allows a predetermined clearance to be left from each side face and a bottom face of the outer cover material 34. A core material 35 is housed between the outer cover material 34 and the inner cover material 33.

The vacuum heat insulating container 3 having a vacuum heat insulating function is formed by sealing an outer peripheral edge between the outer cover material 34 and the inner cover material 33 with the core material 35 disposed between the outer cover material 34 and the inner cover material 33 and performing evacuation.

Although the outer cover material 34 and the inner cover material 33 are not limited to any particular material, the outer cover material 34 and the inner cover material 33 are molded of a resin material having an excellent gas barrier property. For example, a moldable resin, such as polypropylene or an ethylene-vinyl alcohol copolymer, is used.

Although the core material 35 is not limited to any particular material, the core material 35 is made of, for example, polyol or isocyanate. A material used as a core material of a vacuum heat insulating material, such as a molded article made of urethane foam having an open-cell structure or glass fiber or a molded article made of fumed silica, can be used.

As shown in FIG. 3, a housing space S is provided inside the vacuum heat insulating container 3.

A gas adsorbent 36, a water adsorbent 37, and a reinforcing plate 38 having a hole on its center are disposed between a bottom portion of the outer cover material 34 and the core material 35. The vacuum heat insulating container 3 releases less heat from a bottom face than from each side face. Thus, disposing the gas adsorbent 36, the water adsorbent 37, and the reinforcing plate 38 on the bottom face of the vacuum heat insulating container 3 does not interfere with a heat insulating effect.

An exhaust hole for evacuating the vacuum heat insulating container 3 is provided at a position corresponding to the hole of the reinforcing plate 38 of the outer cover material 34, and the exhaust hole is closed with a sealing material (not illustrated) after the evacuation of the vacuum heat insulating container 3. The reinforcing plate 38 can support the sealing material in closing the exhaust hole with the sealing material.

A body protection case 32 is a housing that covers an outer surface of the vacuum heat insulating container 3. The body protection case 32 may be formed of a resin having a heat insulating property, such as styrene foam.

The vacuum heat insulating lid 4 is a member that closes an opening of the vacuum heat insulating container 3.

As shown in FIG. 2, the vacuum heat insulating lid 4 includes a lid outer protection case 42 having an outer shape similar to the outer shape of the body protection case 32. An upper joint portion 47 extending downward is formed on a peripheral edge of a lower face of the lid outer protection case 42 over the entire circumference of the lid outer protection case 42. A joint recess 46 is formed on a lower face of the upper joint portion 47.

An outer housing portion 42A which is surrounded by the upper joint portion 47 and has a recessed shape is formed on the lower face of the lid outer protection case 42.

A lid inner protection case 43 is disposed under the lid outer protection case 42. A lower joint portion 48 extending upward is formed on a peripheral edge of an upper face of the lid inner protection case 43 over the entire circumference of the lid inner protection case 43. A joint projection 49 is formed on an upper face of the lower joint portion 48.

An inner housing portion 43A which is surrounded by the lower joint portion 48 and has a recessed shape is formed on the upper face of the lid inner protection case 43.

The lid outer protection case 42 and the lid inner protection case 43 are integrally formed by joining the joint recess 46 of the upper joint portion 47 and the joint projection 49 of the lower joint portion 48 to each other. In this state, a predetermined internal space I is defined by the outer housing portion 42A of the lid outer protection case 42 and the inner housing portion 43A of the lid inner protection case 43.

A vacuum heat insulating plate 41 is housed in the internal space I. In the present embodiment, fixing members 44 each having a substantially L shape are attached to four corners of the vacuum heat insulating plate 41. The vacuum heat insulating plate 41 can be fixed so as not to move inside the internal space I by the fixing members 44 abutting against the four corners of the internal space I in a state where the vacuum heat insulating plate 41 is housed in the internal space I.

The vacuum heat insulating plate 41 may be fixed to the lid outer protection case 42 and the lid inner protection case 43 by using not the fixing members 44 each having a substantially L shape, but, for example, a linear fixing member provided along each side of the vacuum heat insulating plate 41 or an adhesive.

Although, in the present embodiment, the vacuum heat insulating plate 41 is formed of the same material as the vacuum heat insulating container 3, for example, a vacuum heat insulating material including a core material sealed inside a cover material made of a metal material such as aluminum may be used as the vacuum heat insulating plate 41.

In the present embodiment, the lid outer protection case 42 and the lid inner protection case 43 are formed of the same material as the body protection case 32.

A projecting portion 45 projecting downward is formed near an outer periphery of a lower face of the lid inner protection case 43. The projecting portion 45 is configured in such a manner that an outer side face of the projecting portion 45 abuts against an inner side face of the vacuum heat insulating container 3 in a state where the vacuum heat insulating lid 4 is attached to the vacuum heat insulating container 3 to close the upper face of the vacuum heat insulating container 3. Providing the projecting portion 45 in this manner makes it possible to set a long heat entry path between the vacuum heat insulating container 3 and the vacuum heat insulating lid 4, thereby improving the heat insulating performance of the constant temperature container 1.

Figure 4:
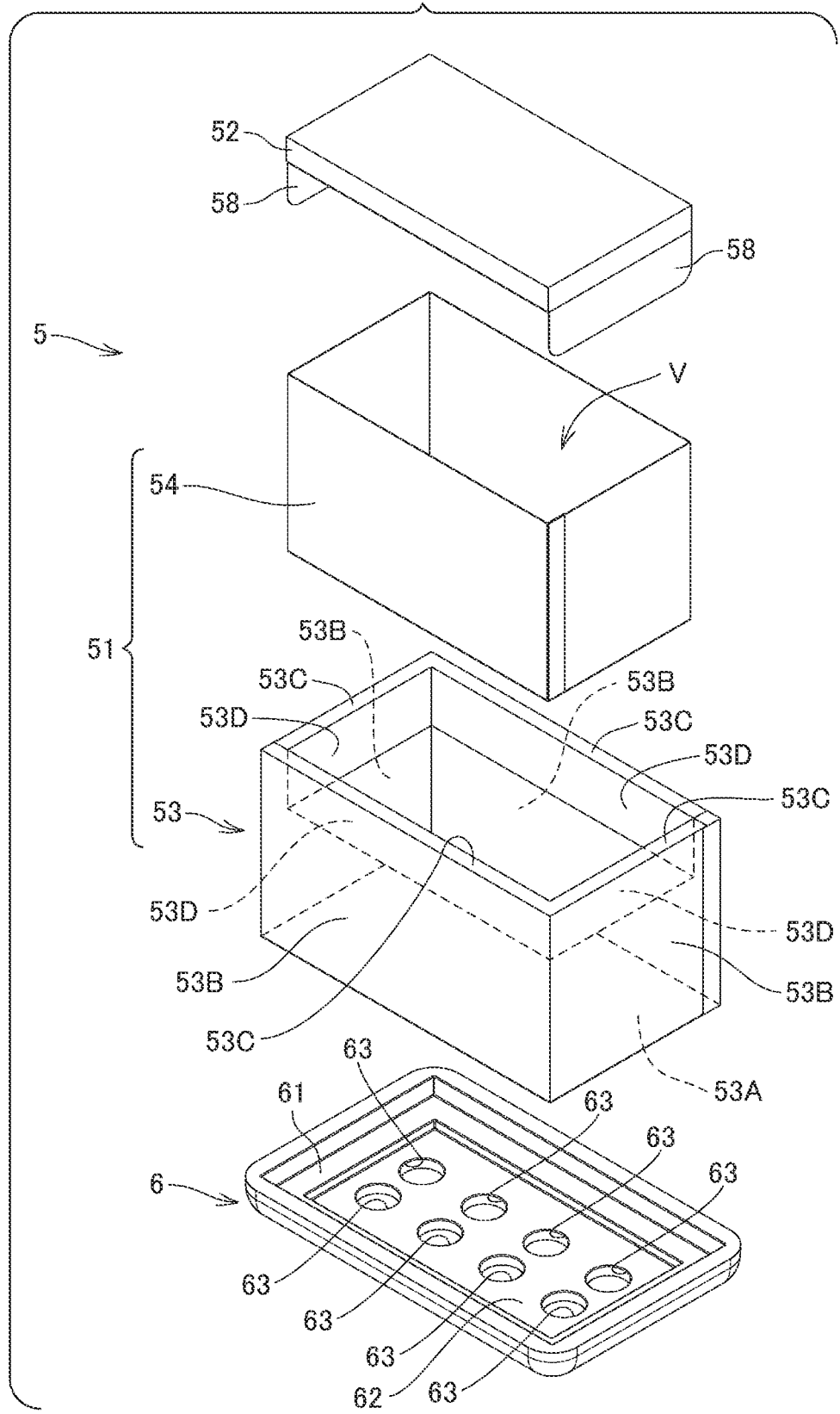
FIG. 4 is an exploded perspective view of a storage box and a support member.

FIG. 4 is an exploded perspective view of the storage box 5 and a support member 6. In FIG. 4, a logger case 59 is omitted.

The storage box 5 is removably housed in the housing space S of the vacuum heat insulating container 3, and the storage box 5 includes a box body 51 and a box lid 52 as shown in FIG. 4.

The box body 51 includes an outer box 53 having a box shape with an open upper face. The outer box 53 includes a bottom plate 53A having a rectangular shape and four side plates 53B which are provided in a standing manner on four sides of the bottom plate 53A. The bottom plate 53A constitutes an outer face of a bottom portion of the box body 51, and each of the side plates 53B constitutes an outer side face of a wall portion of the box body 51.

An upper plate 53C is formed on an upper end edge of each of the side plates 53B, the upper plate 53C extending inward of the outer box 53 with a predetermined width dimension. A folded-back plate 53D extending downward is integrally formed with an inner edge of each of the upper plates 53C. The folded-back plate 53D extends up to a position corresponding to a midway part of each side plate 53B.

An inner box 54 is housed inside the outer box 53. The inner box 54 has a box shape with an open upper face and is formed in such a manner as to abut against an inner face of the folded-back plate 53D.

The outer box 53 and the inner box 54 are both molded into a box shape by bending a transparent sheet-like resin material having plasticity. Examples of the resin material include polypropylene and ABS resin.

Cold storage agents 57 each having a flat-plate shape are stored between each side plate 53B and the corresponding folded-back plate 53D and on an upper face of the bottom plate 53A of the outer box 53. The cold storage agent 57 disposed on the bottom plate 53A is disposed over substantially the entire face of the bottom plate 53A, and a lower end of the cold storage agent 57 disposed on each side plate 53B is in contact with the cold storage agent 57 disposed on the bottom plate 53A.

That is, the cold storage agents 57 are disposed on the bottom portion and the wall portion of the box body 51 with no thermal gap therebetween. This makes it possible to reduce heat transfer from the outside of the storage box 5, thereby maintaining the inside of the storage box 5 within a predetermined temperature range.

Since each folded-back plate 53D is formed up to the position corresponding to the midway part of the corresponding side plate 53B, it is easy to store the cold storage agent 57 between each side plate 53B and the corresponding folded-back plate 53D.

Each cold storage agent 57 is held between the outer box 53 and the inner box 54 by storing the inner box 54 inside the outer box 53 after storing the cold storage agent 57. That is, the box body 51 supports each cold storage agent 57 by sandwiching the cold storage agent 57 from both sides. This makes it possible to reliably support and fix each cold storage agent 57 having a plate shape and prevent the cold storage agents 57 from separating from each other during conveyance of the constant temperature container 1.

A storage space V is provided inside the box body 51, that is, inside the inner box 54.

The box lid 52 is a member that closes an opening of the box body 51 to constitute a top face of the storage box 5. The box lid 52 is formed in a thin box shape by bending the same resin material as the box body 51, and the outer shape of the box lid 52 is substantially the same as the shape of the upper opening of the box body 51.

The box lid 52 of the present embodiment is detachably attached to the box body 51.

Insertion portions 58 each of which extends downward and has a plate shape (flap shape) are formed on respective lower edges of the box lid 52, the lower edges being located on the opposite sides in the longitudinal direction. Each of the insertion portions 58 has the same width dimension as the box lid 52.

In closing the upper opening of the box body 51 with the box lid 52, each insertion portion 58 is inserted between the corresponding folded-back plate 53D and the inner box 54 to fix the box lid 52.

The box lid 52 has substantially the same shape as the upper opening of the box body 51 and the width dimension of the insertion portions 58 is the same as the width dimension of the box lid 52. Accordingly, the box lid 52 is aligned with the upper opening of the box body 51 with each of the insertion portions 58 inserted between the folded-back plate 53D and the inner box 54, and the box lid 52 can be appropriately positioned and fixed to the box body 51. Thus, the box lid 52 can reliably close the box body 51.

The cold storage agent 57 is stored inside the box lid 52. A thickness dimension of the cold storage agent 57 stored inside the box lid 52 may be larger than a thickness dimension of each cold storage agent 57 stored in the box body 51. This makes it possible to reduce the influence of heat transfer through a gap between the vacuum heat insulating container 3 and the vacuum heat insulating lid 4 in the storage space V.

The cold storage agents 57 maintain the inside of the storage box 5 at a temperature lower than room temperature, for example, at approximately 2 to 8° C. Each of the cold storage agents 57 of the present embodiment includes a phase change material capable of using transition heat caused by phase change or phase transition of a substance, and stores such transition heat as heat energy and is used as a latent heat storage material. The cold storage agent 57 is formed by covering the phase change material with a transparent resin cover.

When the cold storage agent 57 is cooled, the phase change material undergoes a phase change from liquid or gel to solid. On the other hand, when the cold storage agent 57 absorbs heat to increase its temperature, the phase change material undergoes a phase change from solid to liquid or gel. That is, the cold storage agent 57 is brought into a state where cold heat is stored through the phase change of the phase change material to solid, which enables the cold storage agent 57 to absorb heat.

A phase change material obtained by appropriately mixing an additive to various paraffins to adjust a freezing point or a melting point where a phase change occurs to a predetermined temperature is used as the phase change material of the cold storage agent 57 of the present embodiment.

The phase change material of the present embodiment has a semitransparent whitish color when the phase change material is liquid or gel and has a white color when the phase change material is solid by being cooled. That is, the phase change material has different colors between a state where cold heat is stored and a state where cold heat is released.

As described above, each of the cold storage agents 57 is formed by covering the phase change material with the cover made of the transparent resin, and the box body 51 and the box lid 52 of the storage box 5 are both formed of a transparent material.

Accordingly, a user of the constant temperature container 1 can visually check the state of each cold storage agent 57 stored in the storage box 5.

As described above, the cold storage agents 57 of the present embodiment are a plurality of plate-like members. Accordingly, in cooling each cold storage agent 57, it is possible to remove the cold storage agent 57 from the storage box 5 and cools only the cold storage agent 57 in, for example, a cooling chamber. Thus, it is possible to cool each cold storage agent 57 in a shorter time and also reduce a space occupied by the cold storage agents 57 inside the cooling chamber during cooling by, for example, stacking the cold storage agents 57 on each other.

A logger case 59 in which a data logger including various sensors is housed is provided on a corner inside the storage box 5.

The support member 6 is housed inside the vacuum heat insulating container 3 and located on the bottom portion thereof.

The support member 6 is formed in a substantially flat-plate shape, and a support recess 61 having substantially the same shape as the outer shape of the storage box 5 is formed on an upper face of the support member 6.

Further, a clearance recess 62 having a rectangular shape smaller than the outer shape of the storage box 5 is formed on an upper face of the support recess 61.

Further, the clearance recess 62 includes a plurality of through holes 63. The through holes 63 of the present embodiment are provided in number and arrangement that enable reduction of the strength of the support member 6 to be prevented.

The support member 6 is formed of, for example, a heat insulating material such as styrene foam.

The storage box 5 is housed, and supported and fixed inside the vacuum heat insulating container 3 by being placed on the support recess 61 of the support member 6. In this state, an outer side face of the storage box 5 is disposed with a predetermined clearance G1 left from the inner side face of the vacuum heat insulating container 3. Similarly, the box lid 52 is disposed with a predetermined clearance G2 left from the lower face of the vacuum heat insulating lid 4 and the projecting portion 45.

Further, a clearance G3 is provided between the bottom plate 53A of the storage box 5 and the clearance recess 62.

The constant temperature container 1 is housed in the container case 2 so as to be easily conveyed in conveying a stored item. The container case 2 includes a case body 22 having a box shape with an open upper face and a case lid 21 which is coupled to one side edge of an upper portion of the case body 22.

The case lid 21 and the case body 22 can be closed with a case fastener 23. A handle 24 is attached to the case fastener 23 to open and close the case fastener 23.

A plurality of case lid fixtures 25 are provided on a front face of the case body 22. A plurality of fixing belts provided on a top face of the case lid 21 are coupled to the case lid fixtures 25 so that the container case 2 and the constant temperature container 1 can be more reliably maintained in a closed state.

Handles 26 are provided on respective side faces of the container case 2, and a conveyance belt 27 is coupled to the side faces. The handles 26 and the conveyance belt 27 enable easy conveyance of the container case 2 and the constant temperature container 1.

A plurality of document storage portions 28 are provided on the front face of the container case 2.

Next, the action of the present embodiment will be described.

The constant temperature container 1 of the present embodiment is used in delivering a stored item such as an investigational drug while maintaining and managing the stored item at a temperature within a predetermined temperature range. The stored item is stored in the storge space V of the storage box 5. The stored item is maintained and managed within the predetermined temperature range by using a double structure of the storage box 5 including the cold storage agents 57 and the vacuum heat insulating container 3.

The constant temperature container 1 maintains the storage space V of the storage box 5 at the temperature within the predetermined temperature range by using the cooled cold storage agents 57. The cold storage agents 57 can be cooled by removing the cold storage agents 57 from the storage box 5 and storing the removed cold storage agents 57 in the cooling chamber. Alternatively, the cold storage agents 57 stored in the storage box 5 may be stored in the cooling chamber and cooled.

Similarly, the vacuum heat insulating lid 4 may be detached, and the storage box 5 stored in the vacuum heat insulating container 3 may be stored in the cooling chamber to cool the cold storage agents 57.

At this time, since the box body 51 and the box lid 52 are formed as separate members, the box body 51 can be stored in the cooling chamber with the box lid 52 detached therefrom. This prevents the box body 51 from being closed with the box lid 52 by mistake at the time of cooling. Thus, the box body 51 can be efficiently cooled.

As described above, the storage box 5 is supported and fixed by the support member 6 with the predetermined clearances G1 and G2 left from the vacuum heat insulating container 3.

This makes it possible to reduce the contact area between the storage box 5 and the vacuum heat insulating container 3 and, at the same time, reduce heat transfer between the storage box 5 and the vacuum heat insulating container 3 by the clearances G1 and G2 serving as heat insulating air layers. Thus, the heat insulating property of the constant temperature container 1 can be improved.

Further, the clearance G3 is provided between the bottom plate 53A of the storge box 5 and the clearance recess 62, and the support member 6 includes the through holes 63. This makes it possible to reduce the contact area between the storage box 5 and the support member 6 and, at the same time, reduce heat transfer between the storage box 5 and the support member 6 and between the storage box 5 and the vacuum heat insulating container 3 through the support member 6 by the clearance G3 serving as a heat insulating air layer.

As described above, in the present embodiment, the constant temperature container 1 includes the vacuum heat insulating container 3, the vacuum heat insulating lid 4 which closes the vacuum heat insulating container 3, and the storage box 5 housed inside the vacuum heat insulating container 3. The storage box 5 includes the box body 51, the box lid 52 which closes the box body 51, and the cold storage agents 57 provided on the bottom portion and the wall portion of the box body 51 and the box lid 62. The constant temperature container 1 includes the support member 6 which is provided between the bottom portion of the box body 51 and the bottom portion of the vacuum heat insulating container 3 and supports the box body 51 in such a manner that the wall portion of the box body 51 is separated from the wall portion of the vacuum heat insulating container 3.

This makes it possible to reduce the contact area between the storage box 5 and the vacuum heat insulating container 3 and, at the same time, reduce heat transfer between the storage box 5 and the vacuum heat insulating container 3 by the clearances G1 and G2 serving as heat insulating air layers. Thus, the heat insulating property of the constant temperature container 1 can be improved.

According to the present embodiment, the box lid 52 is detachably attached to the box body 51. This makes it possible to cool the box body 51 with the box lid 52 detached therefrom, prevents the box body 51 from being closed with the box lid 52 by mistake at the time of cooling, and efficiently cool the box body 51.

According to the present embodiment, the box body 51 includes the outer box 53 and the inner box 54 housed inside the outer box 53. The box lid 52 includes the insertion portions 58, and the box lid 52 is fixed to the box body 51 by the insertion portions 58 inserted between the outer box 53 and the inner box 54.

Accordingly, the box lid 52 is aligned with the upper opening of the box body 51 with the insertion portions inserted between the outer box 53 and the inner box 54, and the box lid 52 can be appropriately positioned and fixed to the box body 51.

According to the present embodiment, each of the cold storage agents 57 is held between the outer box 53 and the inner box 54. Accordingly, each of the cold storage agents 57 can be reliably supported and fixed.

According to the present embodiment, each of the cold storage agents 57 is formed by covering the phase change material with the transparent cover, and the box body 51 and the box lid 52 are both formed of the transparent material. Accordingly, a user of the constant temperature container 1 can visually check the state of each cold storage agent 57 stored in the box body 51 or the box lid 52.

The above embodiment merely describes, as an example, an aspect of the present invention, and any modifications and applications can be made without departing from the gist of the present invention.

For example, although, in the present embodiment, the constant temperature container 1 includes the cold storage agents 57, the present invention is not limited thereto. A member capable of maintaining a predetermined temperature by itself for a certain time, that is, a heat storage agent may be used to maintain the inside of the constant temperature container 1 at a predetermined temperature equal to or higher than ambient temperature.

For example, the storage box 5 may be formed by integrally forming the cold storage agents 57 in a box shape.

INDUSTRIAL APPLICABILITY

The present invention has a configuration having an largely improved heat insulating property and is thus widely applicable to a use that requires keeping cold or warm and a use that requires maintenance and management within a specific temperature range such as a use for storing and conveying an investigational drug, blood, or a sample.

REFERENCE SIGNS LIST 1 constant temperature container
2 container case
3 vacuum heat insulating container (heat insulating container)
4 vacuum heat insulating lid (heat insulating lid)
5 storage box
6 support member
33 inner cover material
34 outer cover material
35 core material
51 box body
52 box lid
53 outer box
53A bottom plate
53B side plate
53C upper plate
53D folded-back plate
54 inner box
57 cold storage agent
58 insertion portion
61 support recess
62 clearance recess
63 through hole
G1, G2, G3 clearance
I internal space
S housing space
V storage space

The invention claimed is:

1. A constant temperature container comprising:
a heat insulating container;
a heat insulating lid configured to close the heat insulating container;
a box body housed inside the heat insulating container;
a box lid configured to close the box body;
a phase change material provided on a bottom portion and
a wall portion of the box body and the box lid; and a support member provided between the bottom portion of the box body and a bottom portion of the heat insulating container, the support member supporting the box body in such a manner that the wall portion of the box body is separated from a wall portion of the heat insulating container.

2. The constant temperature container according to claim 1, wherein the box lid is detachably attached to the box body.

3. The constant temperature container according to claim 2, wherein the box body includes an inner box housed inside the box body,
the box lid includes an insertion portion, and
the box lid is fixed to the box body by the insertion portion inserted between the box body and the inner box.

4. The constant temperature container according to claim 3, wherein the phase change materials are held between the wall portion of the box body and the inner box.

5. The constant temperature container according to claim 1, wherein the phase change material is covered with a cover, and the box body, the box lid, and the cover are all formed of a transparent material.

* * * * *